C. A. RENNER.
ANIMAL TRAP.
APPLICATION FILED FEB. 9, 1918.
1,277,122.
Patented Aug. 27, 1918.
2 SHEETS—SHEET 1.
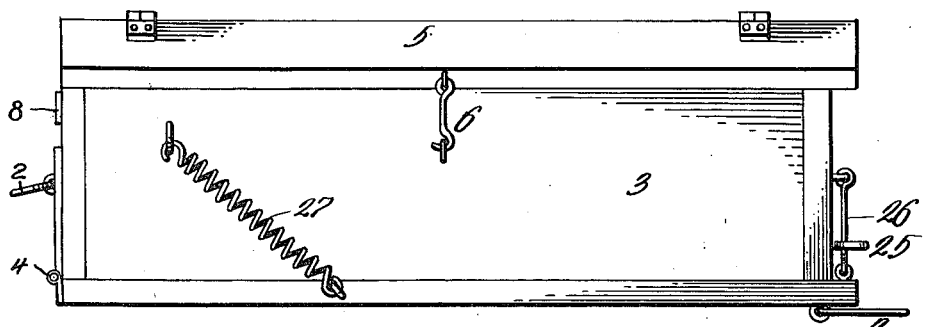
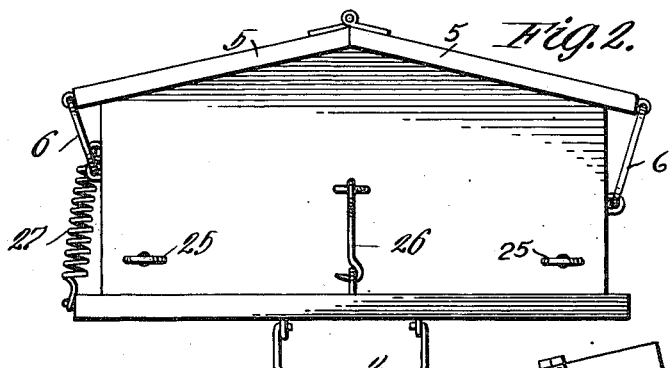
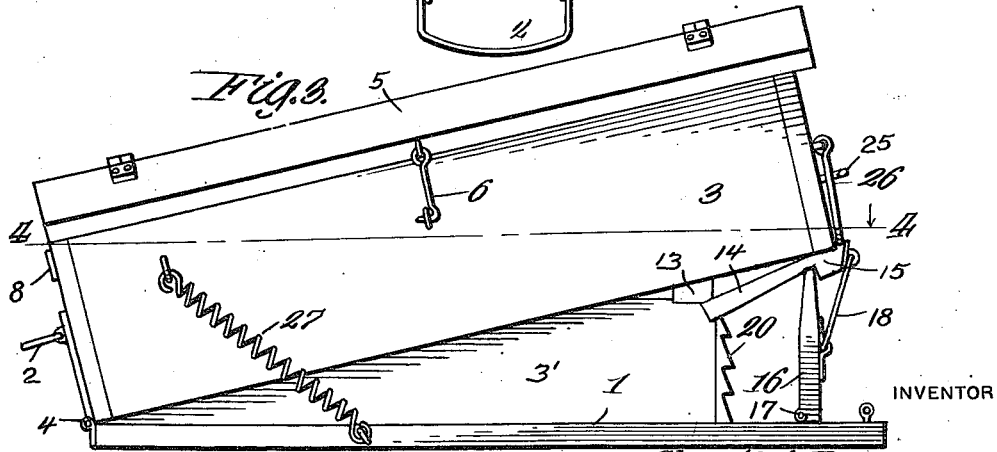
WITNESSES
Guy M. Spring
INVENTOR
Claude A. Renner
BY Richard Owen
ATTORNEY C. A. RENNER.
ANIMAL TRAP.
APPLICATION FILED FEB. 9, 1918.
1,277,122.
Patented Aug. 27, 1918.
2 SHEETS—SHEET 2.
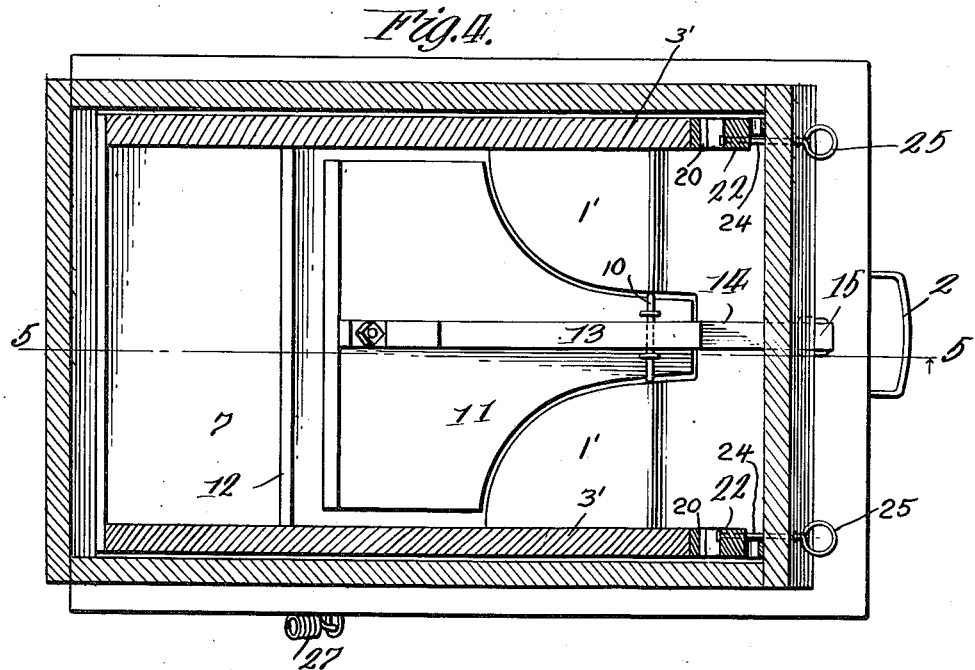
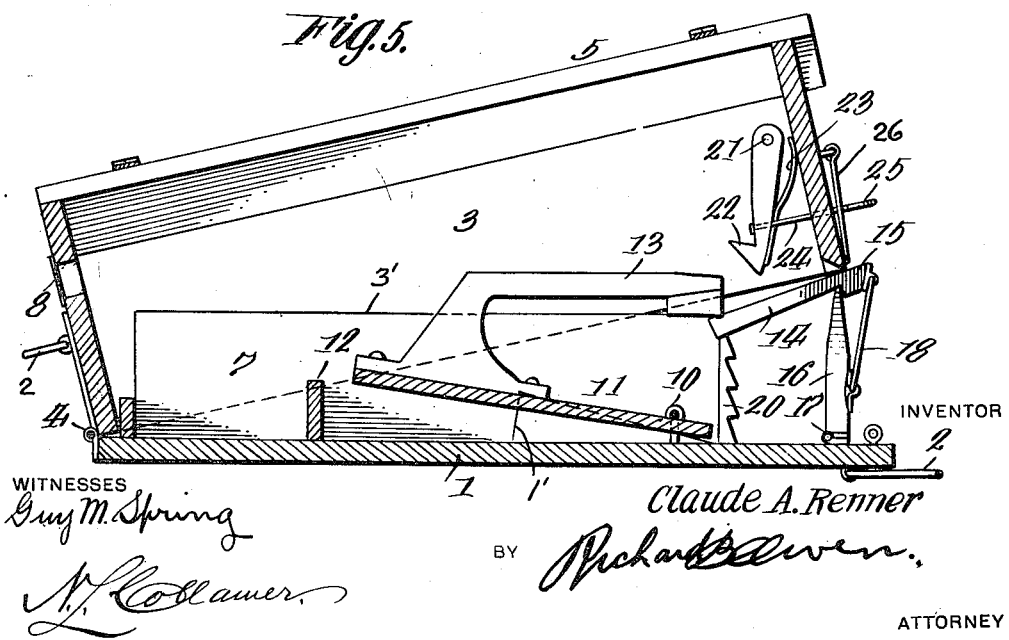
WITNESSES
Guy M. Spring
N. Collamer
INVENTOR
Claude A. Renner
BY Richard Bowen
ATTORNEY

UNITED STATES PATENT OFFICE.

CLAUDE A. RENNER, OF PERKASIE, PENNSYLVANIA.

ANIMAL-TRAP.

1,277,122.   Specification of Letters Patent.   Patented Aug. 27, 1918.

Application filed February 9, 1918. Serial No. 216,370.

*To all whom it may concern:*

Be it known that I, CLAUDE A. RENNER, a citizen of the United States, residing at Perkasie, in the county of Bucks and State of Pennsylvania, have invented certain new and useful Improvements in Animal-Traps, of which the following is a specification.

This invention relates to traps, and more especially to those of the cage type; and the object of the same is to produce a trap whose trigger is very easily tripped by an animal who enters the trap to secure the bait or lure, and which trap when closed becomes locked and can only be unlocked by an operator from the exterior.

These objects are carried out by constructing the trap as described below and as shown in the drawings, wherein:—

Figure 1 is a side elevation of this trap closed,

Fig. 2 a front elevation of the trap in closed position,

Fig. 3 a side elevation of the trap open or set,

Fig. 4 a horizontal section on the line 4—4 of Fig. 3, and

Fig. 5 a vertical section on the line 5—5 of Fig. 4.

The trap herein shown is a portable one, and it comprises a base 1 having foldable handles 2 by means of which it may be carried from point to point; and a body 3 of box-shape hinged at 4 at its rear end to the base and having fixed ends and sides, as well as hinged cover panels 5 held normally closed by hooks and eyes or other latches as at 6. Upon the base at the rear of the same is a compartment 7 for the bait or lure, and through the rear end of the body is an opening 8 to admit light and attract the animals which enter from the right as seen in Figs. 3 and 5.

Hingedly mounted at 10 upon the bottom is a platform 11 of a size and shape to permit it to lead obliquely upward between beveled blocks 1' on the base toward the partition 12 which defines the compartment 7, and this platform carries an overlying rigid finger 13 at about its transverse center as seen in Fig. 4. The numeral 14 designates a trigger having in its under sides near its front a notch 15 adapted to rest on a fulcrum bar 16 which is reduced at its upper end and hinged at 17 at its lower end to the base 1 at its transverse center, and the front end of the trigger and the forward side of the bar are further connected by means of a link 18. When the trap is to be set, the body is raised as high as desired, the fulcrum bar stood up as seen in Figs. 3 and 5, the trigger engaged over it with its notch 15 resting on the point of said bar and its rear end passed under the tip of said finger 13, and this finger and the platform now assume the position shown in Fig. 5 so that the trap is ready for the entrance of the animal to be trapped. When he enters he passes up over the platform toward the bait compartment 7 and as he depresses the platform he draws the finger off the trigger so that the latter is released and the front end of the body descends, housing the trigger and the fulcrum bar within the same in a manner which will be clear.

For holding the body latched when it descends duplicate devices are provided at its front end as will now be described. Upstanding from the base at opposite sides of the platform 11 are side pieces 3' each having at its front end a series of ratchet teeth 20 facing downward. Pivoted within the body at 21 is a hooked pawl 22, whose hook is adapted to engage with said teeth when the body descends. The pawl is swung normally to the rear by means of a spring 23, which throws its hook into engagement with said teeth; and overcoming this normal tendency or movement of the pawl is accomplished by drawing on a rod or link 24 which extends through the front of the body and has a finger ring 25 exposed there as seen in Fig. 2. Also the body and base may here be connected by a hook-and-eye device 26 if desired. These safeguards are thrown around the trap because I propose to use it for catching valuable and sometimes dangerous animals, and as they are caught alive and will be transported to a place where they are to be taken from the cage, it becomes necessary to latch or lock the cage very firmly closed while the operator carries it by means of the handle 2. As additional means for causing the quick descent of the body when the trigger has been tripped, I may employ springs as seen at 27 in Figs. 1 and 3, although of course, the average trapper puts stones and other weights on top of the trap if it has no springs. The parts may be made of wood or other material, and it is quite possible to amplify the details without departing from the principle of my invention. I have refrained from giving dimensions, because they are not essential to a clear understanding of the idea.

What is claimed as new is:—

1. In a cage trap, the combination with a base, a box-like body hinged at its rear end thereto, a bait-compartment within the base, and a platform pivoted to this base forward of said compartment and having an overlying finger; of an upstanding fulcrum bar hinged on the base near its front end, and a trigger having a notch near its front end on the underside to engage the tip of said bar when its rear end underlies said finger for supporting said body as described.

2. In a cage trap, the combination with a base having upstanding side pieces, a transverse partition connecting said side pieces and producing a bait receptacle in rear of the same, and inclined blocks between said side pieces near their front ends and spaced from each other; of a platform hingedly mounted on the base between said blocks and shaped to conform with their rear edges, its free rear end standing forward of said partition, a box-like body hinged at its rear end upon said base in rear of the bait compartment and adapted to inclose said side pieces when said body is closed down upon the base, and a trigger mechanism tripped by the ascent of an animal over said platform.

3. In a cage trap, the combination with a base having upright side pieces provided with downwardly facing ratchet teeth at their front ends, a pivoted platform on the base between said side pieces, a box-like body hinged at its rear end upon said base and inclosing said side pieces when it closes downward onto the base, and a trigger mechanism actuated by the ascent of an animal over said platform; of catches pivotally mounted within said body near its front end and having teeth at their lower extremities, springs drawing said extremities into engagement with the ratchet teeth on said side pieces when the body descends, rods leading from said catches forward through the front end of the body, and finger rings on the exposed ends of said rods.

4. In a trap, the combination with a base element, and a box-like cover element; of a supporting bar hinged at its lower end to said base element and reduced at its upper end, a trigger having a notch in its lower face overlying said reduced end of the bar with its body underlying the front end of said cover when the latter is raised, a link loosely connecting the front extremity of said trigger with the front side of said bar, and an animal-moved finger mounted on the base for engagement with the other end of the trigger until tripped.

In testimony whereof I affix my signature in presence of two witnesses.

CLAUDE A. RENNER.

Witnesses:
EDWIN J. RENNER,
HARRISON H. LANDIS.